United States Patent
Wang et al.

(10) Patent No.: US 11,164,027 B2
(45) Date of Patent: Nov. 2, 2021

(54) DEEP LEARNING BASED LICENSE PLATE IDENTIFICATION METHOD, DEVICE, EQUIPMENT, AND STORAGE MEDIUM

(71) Applicant: Ping An Technology (Shenzhen) Co., Ltd., Guangdong (CN)

(72) Inventors: Jianzong Wang, Guangdong (CN); Jin Ma, Guangdong (CN); Zhangcheng Huang, Guangdong (CN); Tianbo Wu, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 565 days.

(21) Appl. No.: 16/097,291

(22) PCT Filed: Aug. 31, 2017

(86) PCT No.: PCT/CN2017/099840
§ 371 (c)(1),
(2) Date: Oct. 29, 2018

(87) PCT Pub. No.: WO2018/233038
PCT Pub. Date: Dec. 27, 2018

(65) Prior Publication Data
US 2021/0224567 A1    Jul. 22, 2021

(30) Foreign Application Priority Data
Jun. 23, 2017  (CN) .......................... 201710485881.4

(51) Int. Cl.
*G06K 9/32* (2006.01)
*G06K 9/46* (2006.01)
(Continued)

(52) U.S. Cl.
CPC .......... *G06K 9/325* (2013.01); *G06K 9/4652* (2013.01); *G06K 9/6215* (2013.01);
(Continued)

(58) Field of Classification Search
CPC .... G06K 9/325; G06K 9/6215; G06K 9/4652; G06K 9/6256; G06K 9/6267;
(Continued)

(56) References Cited

U.S. PATENT DOCUMENTS 9,760,789 B2 *   9/2017  Burry .................. G06K 9/3258
2012/0106802 A1 *  5/2012  Hsieh .................. G06K 9/3258
                                                    382/105
(Continued)

FOREIGN PATENT DOCUMENTS

CN    106446150 A    2/2017
CN    106778659 A    5/2017

OTHER PUBLICATIONS

Liu et al., SSD: Single Shot Multi Box Detector, Springer International Publishing, pp. 21-37. (Year: 2016).*
(Continued)

*Primary Examiner* — John B Strege

(57) ABSTRACT

A deep learning based license plate identification method, device, equipment, and storage medium. The deep learning based license plate identification method comprises: extracting features of an original captured image by using a single shot multi-box detector to obtain a target license plate image; correcting the target license plate image to obtain a corrected license plate image; identifying the corrected license plate image by using a bi-directional long short-term memory model to obtain target license plate information. When the deep learning based license plate identification method performs license plate identification, the identification efficiency is high and the accuracy is higher.

14 Claims, 4 Drawing Sheets performing normalization processing on the original captured image by using a trained single shot multi-box detector to obtain an original license plate image — S11 performing multi-scale feature extraction on the original license plate image by using a convolutional layer to obtain several layers of feature maps, extracting features of the several layers of feature maps by using several default boxes with different ratios to obtain classification results of each of the default boxes — S12 selecting classification result of the default box by using non-maximum suppression to obtain the target license plate image — S13

(51) Int. Cl.
  *G06K 9/62* (2006.01)
  *G06N 3/08* (2006.01)
(52) U.S. Cl.
  CPC ......... *G06K 9/6232* (2013.01); *G06K 9/6256* (2013.01); *G06K 9/6267* (2013.01); *G06N 3/08* (2013.01); *G06K 2209/01* (2013.01); *G06K 2209/15* (2013.01)
(58) Field of Classification Search
  CPC ............ G06K 9/6232; G06K 2209/15; G06K 2209/01; G06N 3/08
  See application file for complete search history.

(56) References Cited

U.S. PATENT DOCUMENTS

| | | | |
|---|---|---|---|
| 2014/0177925 A1* | 6/2014 | Wu | G06K 9/00 382/105 |
| 2014/0355836 A1* | 12/2014 | Kozitsky | G06K 9/685 382/105 |
| 2018/0089505 A1* | 3/2018 | El-Khamy | G06T 7/73 |

OTHER PUBLICATIONS

Zhou, Kailong, Research on Deep Learning Based Image Recognition Application, China Excellent Master's Thesis Full-text Database Information Technology Series, Mar. 15, 2017, ISSN: 1674-0246.

Hui Li et al., Reading Car License Plates Using Deep Convolutional Neural Networks and LSTMs, Jan. 21, 2016, pp. 1-17.

\* cited by examiner

DEEP LEARNING BASED LICENSE PLATE IDENTIFICATION METHOD, DEVICE, EQUIPMENT, AND STORAGE MEDIUM

This patent application is based on the Chinese Patent Application No. 201710485881.4 filed on Jun. 23, 2017, entitled "Deep Learning Based License Plate Identification Method, Device, Equipment, And Storage Medium", and requires priority.

FIELD OF THE INVENTION

The present application relates to a technical field of image processing technology, in particular to a deep learning based license plate identification method, device, equipment, and storage medium.

BACKGROUND OF THE INVENTION

With the development of the economy, the cost of image obtaining and storage is getting lower and lower. Departments that need to supervise the license plate, such as a traffic department and a parking lot, obtain and store a large amount of license plate image data. Most of these license plate image data are obtained under natural application scenarios and with diverse data features. As an important research topic in the field of image information processing and identification, the license plate identification system has great application value in vehicle peccancy surveillance and parking lot management.

The traditional license plate identification systems are mostly based on fixed application scenarios, and the obtained license plate image data is obtained based on a fixed camera, a fixed shooting angle, a fixed illumination condition, or even a fixed vehicle driving direction, which have strict constraints on the obtained license plate image data. In the natural application scene, the captured license plate image data has different image quality, different shooting angles, different lighting conditions, etc., which brings great challenges to the traditional license plate identification system, making the traditional license plate identification system unable to be applied in the natural application scene. The license plate image data captured in the natural application scene cannot be identified.

SUMMARY OF THE INVENTION

The present invention provides a deep learning based license plate identification method, device, equipment, and storage medium to solve the problem that the existing license plate identification system cannot perform license plate identification in a natural application scene.

First, the invention provides a deep learning based license plate identification method, the method comprises:

extracting features of an original captured image by using a single shot multi-box detector to obtain a target license plate image;

correcting the target license plate image to obtain a corrected license plate image;

identifying the corrected license plate image by using a bi-directional long short-term memory model to obtain target license plate information.

Second, the invention provides a deep learning based license plate identification device, the device comprises:

a license plate detection module, used for extracting features of an original captured image by using a single shot multi-box detector to obtain a target license plate image;

a license plate correction module, used for correcting the target license plate image to obtain a corrected license plate image;

a license plate identification module, used for identifying the corrected license plate image by using a bi-directional long short-term memory model to obtain target license plate information.

Third, the invention provides a terminal equipment, the equipment comprises a memory, a processor, and a computer program which is stored in the memory and can be operated on the processor, wherein the processor implements following steps when executing the computer program:

extracting features of an original captured image by using a single shot multi-box detector to obtain a target license plate image;

correcting the target license plate image to obtain a corrected license plate image;

identifying the corrected license plate image by using a bi-directional long short-term memory model to obtain target license plate information.

Fourth, the invention provides a computer readable storage medium, the computer readable storage medium stores a computer program, wherein the computer program implements following steps when the computer program is executed by a processor:

extracting features of an original captured image by using a single shot multi-box detector to obtain a target license plate image;

correcting the target license plate image to obtain a corrected license plate image;

identifying the corrected license plate image by using a bi-directional long short-term memory model to obtain target license plate information.

Compared with the prior art, the embodiments of the invention have the following advantages: the invention provides a deep learning based license plate identification method, device, equipment, and storage medium. By extracting features of an original captured image by using a single shot multi-box detector to obtain a target license plate image, it can detect the license plate for the original captured image obtained in any shooting scene; while the single shot multi-box detector without the fully connected layer can effectively improve the detecting efficiency compared with other detection models with fully connected layers. Then, the target license plate image is corrected to obtain the corrected license plate image to avoid influencing the efficiency and accuracy of the subsequent license plate identification due to the license plate image tilting. Then identifying the corrected license plate image by using a bi-directional long short-term memory model is beneficial to improve the efficiency and accuracy of the license plate identification, and can realize end-to-end identification without human intervention.

BRIEF DESCRIPTION OF THE DRAWINGS

In order to more clearly illustrate the technical solutions in the embodiments of the present invention, the drawings configured in the description of the embodiments will be briefly described below. Obviously, the drawings in the following description are merely some embodiments of the present invention. For those skilled in the art, other drawings may also be obtained based on these drawings without any creative work.

DETAILED DESCRIPTION OF THE PREFERRED EMBODIMENT

In the following description, specific details such as a particular system structure, technology are presented for the purpose of illustration rather than limitation in order to gain a thorough understanding of the embodiments of the invention. However, it will be apparent to those skilled in the art that the embodiments of the invention can be implemented in other embodiments without these specific details. In other cases, detailed descriptions of well-known systems, devices, circuits, and methods are omitted to avoid unnecessary details to hinder the description of the embodiments of the present invention.

The First Embodiment

Figure 1:
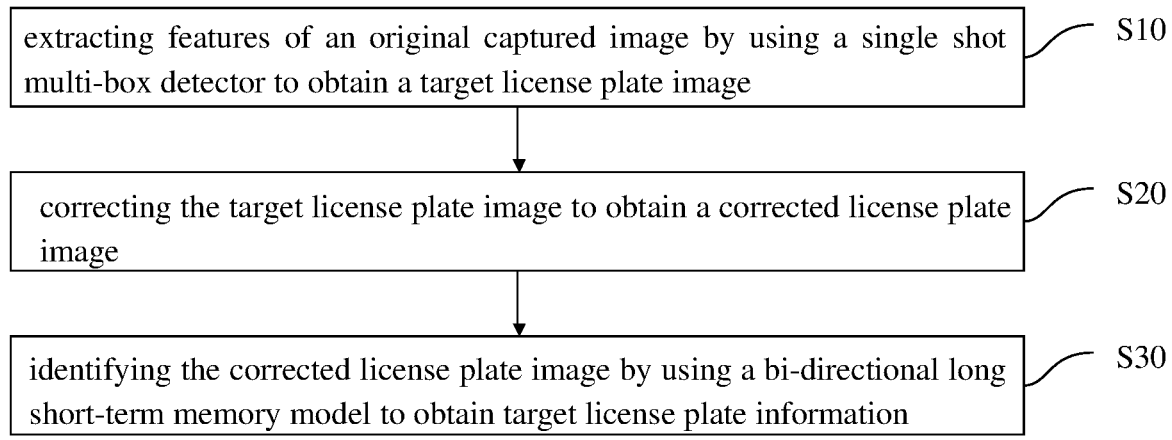
FIG. 1 is a flow chart of the deep learning based license plate identification method in the first embodiment of the present invention.

FIG. 1 shows a flow chart of the deep learning based license plate identification method in the embodiment of the present invention. This deep learning based license plate identification method can be applied to the license plate identification systems in the departments that need to supervise the license plate, such as the traffic department and the parking lot, and is used for identifying the collected license plate image data to obtain the corresponding target license plate information to achieve the purpose of supervising the vehicle. As shown in FIG. 1, the deep learning based license plate identification method comprises following steps:

S10: extracting features of an original captured image by using a single shot multi-box detector to obtain a target license plate image.

The single shot multi-box detector (SSD model) is a model that uses a single deep neural network model to achieve target detection and identification. The original captured image can be an image directly obtained after shooting with a shooting device, an image captured in a fixed application scene, or an image captured in a natural application scene. In this embodiment, the SSD model adopts VGG-16 as the basic network, and the auxiliary structure is added to form a deep learning model to detect the original captured image, and a rectangular box is used to mark the position of the license plate in the original captured image to obtain the target license plate image. Compared with other deep learning models, the efficiency and accuracy of license plate detection can be guaranteed.

Compared with a deep learning model with a fully connected layer such as the MultiBox model and the YOLO model, each output after the fully connected layer is mapped to the entire image, making the detection process slow. In this embodiment, when the image is detected by using the SSD model without the fully connected layer, each output only perceives the information around the target (such as context information), thereby the image detection speed can be accelerated and the image detection accuracy can be improved. In addition, in the deep learning model such as MultiBox model and YOLO model, the fully connected layer will limit the image size entering the VGG-16 network structure, that is, the VGG-16 network structure pre-configures the input size of its network design. The input size of the image entering the VGG-16 network structure can only be the same as the input size of the network design. When the image is detected by the SSD model without the fully connected layer, the image size of the input VGG-16 network structure is not limited by the input size of the network design because there is no limitation of the fully connected layer. In this embodiment, the SSD model can set appropriate image input size according to the resolution of the specific task and data to train the network. For example, the input size of the set image in this embodiment is 512*512.

Figure 2:
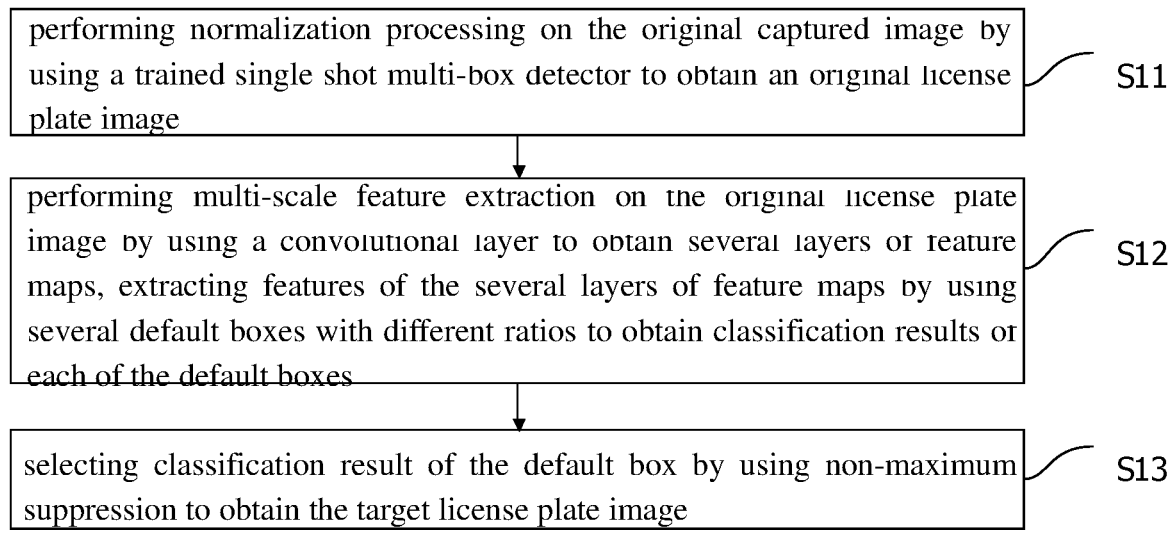
FIG. 2 is a specific flow chart of the step S10 in FIG. 1.

As shown in FIG. 2, in the step S10, the extracting features of the original captured image by using the single shot multi-box detector to obtain the target license plate image specifically includes the following steps:

S11: performing normalization processing on the original captured image by using a trained single shot multi-box detector to obtain an original license plate image.

In this embodiment, before extracting features for the original captured image taken under any shooting scene (including fixed application scenes and natural application scenes), the SSD model for license plate detection must be pre-trained in order to directly call the trained SSD model to normalize the original captured image to improve the efficiency and accuracy of the license plate detection when the license plate is detected. The normalization process refers to normalizing all the original captured images of the input SSD model into a uniform size, so that the obtained original license plate image is more easily detected, and the efficiency and accuracy of the license plate detection are improved.

It can be understood that, in the deep learning based license plate identification method, the method further comprises before the step S11: pre-training the single shot multi-box detector, and storing the trained single shot multi-box detector. So the original captured image can be normalized by using the trained single shot multi-box detector in step S11 to obtain the original license plate image.

The specific process of training the SSD model is as follows: first, obtaining multiple original captured images for SSD model training, and marking the ground truth of all the license plates that appear in each original captured image. The ground truth comprises license plate type information such as blue license plate, yellow license plate, white license plate, black license plate, and green license plate. And the license plate location is marked by a rectangular box to obtain the ground truth box. Then finding the default box corresponding to each ground true box with largest intersection-over-union (IOU) as the positive sample matched with the ground true box. Next, finding the default boxes with the IOU of the ground truth boxes greater than the preset value (0.5 in this embodiment) in the remaining default boxes as the positive samples matched with the ground true boxes. Finding the default boxes with the IOU of the ground truth boxes not greater than the preset value (0.5 in this embodiment) in the remaining default boxes as the negative samples matched with the ground true boxes. Using the positive samples and negative samples to train the single shot multi-box detector to obtain the trained single shot multi-box detector, and storing the trained single shot multi-box detector in the database in order to directly use the trained single shot multi-box detector later. In this embodiment, the default boxes corresponding to the multiple positive samples can be found for a marked ground true box, which is beneficial to improve training efficiency, instead of taking the largest IOU one as the default box of the positive sample and others as the negative samples like MultiBox.

The IOU is the overlap rate between the rectangular box and the default box of the license plate location generated by the SSD model, and is used to evaluate the accuracy of the detection. The IOU is the intersection of the detection result and the ground truth divided by the union of the detection result and the ground truth, that is $$IOU = \frac{\text{Detection Result} \cap \text{GroundTruth}}{\text{Detection Result} \cup \text{GroundTruth}}.$$

In the training process of the SSD model, the positive and negative samples of the original captured image are determined according to the IOU of the default box and the ground truth box. Then training samples are expanded by cropping, mirroring, adding noise to obtain more training samples. And based on all the obtained training samples, the SSD model is trained to improve the accuracy of the trained SSD model for detecting the license plate. Further, in the SSD model training process, all the training samples of the input SSD model need to be normalized to normalize all the training samples into a uniform size to improve the training efficiency of the SSD model.

For the SSD model, according to the granularity of the extracted features of each layer of the VGG-16 network structure, the scale of the default box matched with the feature granularity of the layer is determined, making the default box extraction strategy of the SSD model cover the scale and position of most of the original captured images. And the trained SSD model can be obtained by searching for positive and negative samples for training according to the IOU of the default box and the ground truth box. Therefore, when the original captured image is extracted by the trained SSD model to detect the license plate, the feature maps of all the trained samples can be obtained by doing only one feature extraction of the original captured image, avoiding using the Faster-RCNN model that needs the step of extracting the target box, and avoiding extracting part of the images repeatedly when the target boxes overlaps. As such, the detection efficiency can be effectively improved when the SSD model is used for license plate detection.

S12: performing multi-scale feature extraction on the original license plate image by using a convolutional layer to obtain several layers of feature maps, extracting features of the several layers of feature maps by using several default boxes with different ratios to obtain classification results of each of the default boxes.

In this embodiment, the VGG-16 convolutional layers include 38*38*512 convolutional layer, 19*19*512 convolutional layer, 10*10*512 convolutional layer, 5*5*512 convolutional layer, 3*3*512 convolution Layer, and 1*1*512 convolutional layer. Each convolution layer corresponds to a detector and a classifier. The original license plate image output by the trained SDD model is sequentially input into each convolution layer for multi-dimensional feature extraction to obtain a six-layer feature map. The six-layer feature map is extracted by default boxes with 6 ratios 1, 1/2, 1/3, 1/4, 2, and 3, making the detector and classifier of each layer of the convolution layer output the corresponding classification result. The classification result output by each detector and classifier includes classification and confidence. It can be understood that the default boxes with different ratios are performed on the feature map after feature extraction of the input original license plate image, making each convolution layer need one feature extraction during feature extraction, which is beneficial to improve feature extraction efficiency.

S13: selecting classification result of the default box by using non-maximum suppression to obtain the target license plate image.

The non-maximum suppression (NMS) is an algorithm for suppressing an element that is not a maximum value and searching for a local maximum value, that is, an algorithm that searches for a maximum value within a range. In the license plate detection, the classifier is created first, the classifier gives a fixed size image, and the classifier determines whether the license plate exists in the original image. Then the classifier is converted to a detector, that is, by sliding the window or other means on the original license plate image, multiple sizes of boxes (windows) are generated. The boxes are resized to the fixed size, and then are detected by the classifier to output the target license plate image. The target license plate image is an image corresponding to the optimal box selected from multiple boxes by using NMS. The sliding window method is used to generate multiple boxes (each with a classifier score), and the process of suppressing redundant boxes using NMS is as follows: sorting the scores of all the boxes in descending order, and selecting the highest score and its corresponding box; traversing the remaining boxes, if the IOU of the current highest scored box is greater than a certain threshold, deleting the box; selecting a unprocessed box with highest score, repeating the above process.

In this embodiment, after obtaining the feature map of each default box in the step S12, Input detector and classifier uses Softmax to calculate the probability value of each default box belonging to all classifications. The probability value is the classification result of the default box. The NMS criteria is used to select the classification with the highest probability value as the classification of the default box. That is, the default box with the largest classification result is selected as the target box from the classification result of the default box. Traverse the other default boxes, if the IOU of other default boxes and the target box with the largest classification result is greater than a certain threshold, the corresponding default box will be deleted. Repeat the above process, select the default box with the largest classification result as the new target box in the remaining default boxes. Then, the IOU of the remaining default box and the target box is calculated by traversing, and if the IOU is greater than a certain threshold, delete the corresponding default box, thereby all the retained target boxes are obtained. The target license plate image is acquired based on the retained target boxes, that is, the image corresponding to each target box is the target license plate image.

S20: correcting the target license plate image to obtain a corrected license plate image.

In the step S10, after detecting the license plate and extracting features for the original captured image, the obtained target license plate image may have an angular offset. If the license plate identification is directly performed, it may be difficult to identify due to the tilt of the characters, which affects the efficiency and accuracy of the identification. Therefore, the target license plate image needs to be corrected to make the output corrected license plate image easier to identify in order to improve the efficiency and accuracy of the license plate identification.

Figure 3:
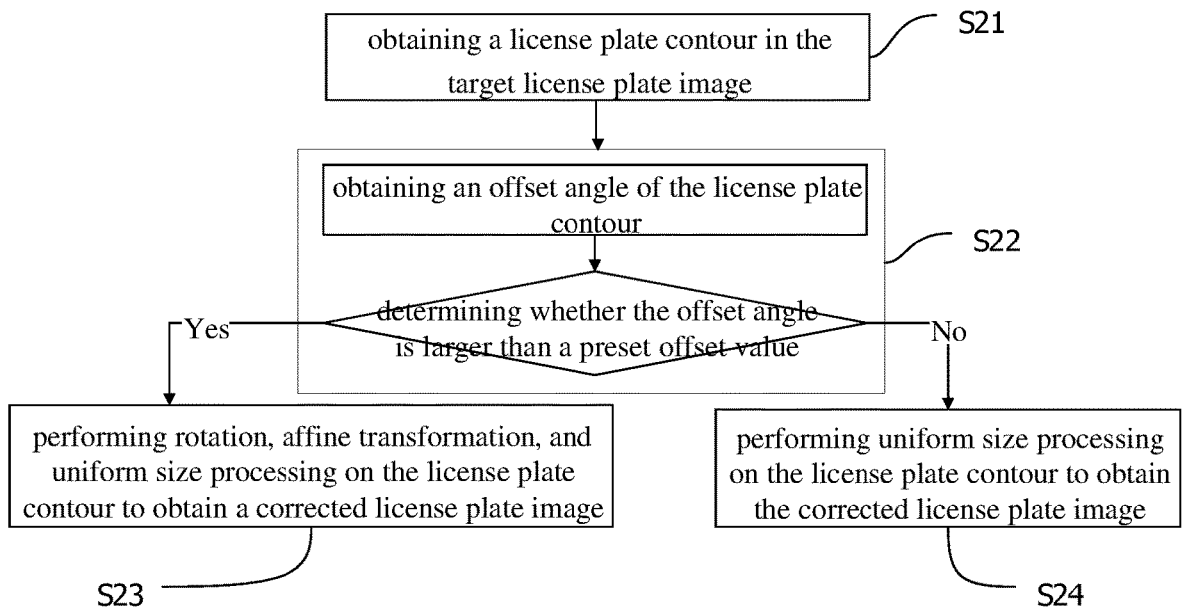
FIG. 3 is a specific flow chart of the step S20 in FIG. 1.

As shown in FIG. 3, in the step S20, the correcting the target license plate image to obtain the corrected license plate image comprises following steps:

S21: obtaining a license plate contour in the target license plate image.

The SSD model is used to select the rectangular default box in the original captured image to determine the corresponding target license plate image. The license plate contour in the default box is then determined to perform license plate identification based on the image information in the license plate contour. In this embodiment, the license plate contour in each target license plate image corresponds to a circumscribed rectangle, and the license plate contour can be determined according to the circumscribed rectangle.

Further, in the step S21, the obtaining the license plate contour in the target license plate image comprises following steps:

S211: obtaining a color similarity between a license plate area and an edge area in the target license plate image.

The current license plate includes five color license plates, such as blue license plate, yellow license plate, white license plate, black license plate, and green license plate. In the target license plate image of each color, the color of the license plate area within the license plate contour is different from the color of the edge area outside the license plate contour. The license plate contour can be determined by obtaining the color salience inside and outside the license plate contour, thereby improving the obtaining efficiency of the license plate contour. In this embodiment, the color similarity between the license plate area and the edge area in the target license plate image is calculated to determine the color saliency.

The current color feature can be represented by a color histogram. There are mainly three independent one-dimensional histograms, which are histograms of three components of color image RGB. The color similarity is determined based on the distance or intersection between the color histograms, such as absolute distance (also known as city-block), Bhattacharyya, Euclideandistance, Histogram intersection, x2 distance, reference color table, and central distance.

S212: determining whether the color similarity is greater than a preset similarity.

The preset similarity is a standard value used to determine the color saliency. In this embodiment, if the color similarity between the license plate area and the edge area is greater than the preset similarity, it is determined that the license plate area and the edge area have color saliency. If the color similarity between the license plate area and the edge area is not greater than the preset similarity, it is determined that the license plate area and the edge area have no color saliency.

S213: if yes, taking the license plate area as the license plate contour.

When the color similarity between the license plate area and the edge area in the target license plate image is greater than the preset similarity, that is, the color of the license plate area inside and outside is significant (such as the blue license plate on the white car), the license plate area can be directly used as the license plate contour without further processing, which is beneficial to improve the obtaining efficiency of the license plate contour.

S214: if no, performing gray-scale processing, Sobel operator, binarization, and closing operations on the target license plate image to obtain the license plate contour.

When the color similarity between the license plate area and the edge area in the target license plate image is not greater than the preset similarity, that is, the color of the license plate area inside and outside is not significant (such as the blue license plate on the blue car), the target license plate image needs to be performed gray-scale processing, Sobel operator, binarization, and closing operations to obtain the license plate contour. Gray-scale processing is to convert images of various formats into grayscale images to reduce the subsequent images calculation amount. The Sobel operator is used to detect vertical edges to detect the edges of characters on the license plate and also to detect other edges of the target license plate image. The binarization is used to highlight the detected vertical edges. The closing operation is used to expand the vertical edge so that the edges of the characters closer to the license plate are integrated to form a connected area. The license plate contour can be obtained by taking the contour of the connected area. The connected area formed by the edges of the non-license plate area are not rectangular in most cases in order to get a rectangular license plate contour.

S22: obtaining an offset angle of the license plate contour, and determining whether the offset angle is larger than a preset offset value.

The offset angle of the license plate contour refers to the angle of the license plate contour in the target license plate image with respect to the border of the target license plate image (especially the horizontal border). The preset offset value is a standard value for determining whether it is necessary to perform angle correction on the obtained target license plate image for subsequent identification. When the offset angle of the license plate contour is greater than the preset offset value, the circumscribed rectangle of the license plate contour needs to be corrected; when the offset angle of the license plate contour is not greater than the preset offset value, the circumscribed rectangle of the license plate contour does not need to be corrected, which improves the processing efficiency of the entire license plate identification process.

S23: if yes, performing rotation, affine transformation, and uniform size processing on the license plate contour to obtain a corrected license plate image.

When the offset angle of the license plate contour is greater than the preset offset value, correction processing such as rotation, affine transformation, and uniform size processing is required to avoid affecting the efficiency and accuracy of license plate identification. The rotation is based on the center of the license plate contour so that the offset angle of the license plate contour is not greater than the preset offset value. Affine transformation is a linear transformation between two-dimensional coordinates and two-dimensional coordinates, and maintain the "straightness" and "parallelism" of the two-dimensional graphics. Affine transformation is implemented by a series of sub-transformations, including translation, scaling, flipping, rotation, and clipping, to avoid deformation caused by the rotation of the license plate contour and ultimately affecting the efficiency and accuracy of license plate identification.

S24: if no, performing uniform size processing on the license plate contour to obtain the corrected license plate image.

When the offset angle of the license plate contour is not greater than the preset offset value, correction processing such as rotation and affine transformation is not required, and only the uniform size processing of the license plate contour is required. The license plate contour is converted into a standard license plate size, so that the license plate identification can be performed later. It improves the license plate identification efficiency, and avoids that the obtained size of the corrected license plate image is not uniform, and avoids affecting the identification efficiency.

S30: identifying the corrected license plate image by using a bi-directional long short-term memory model to obtain target license plate information.

There are a forward LSTM and a reverse LSTM in the hidden layer in the bi-directional long short-term memory model (BLSTM model). The forward LSTM captures the above feature information, while the reverse LSTM captures the below feature information. It can capture more feature information than the one-way LSTM. Therefore, the BLSTM model is better than the one-way LSTM model or the one-way RNN model. In this embodiment, the BLSTM model and the deep learning model formed by the convolution layer are used to identify the license plate image, which is beneficial to improve the identification efficiency and accuracy of the license plate.

Figure 4:
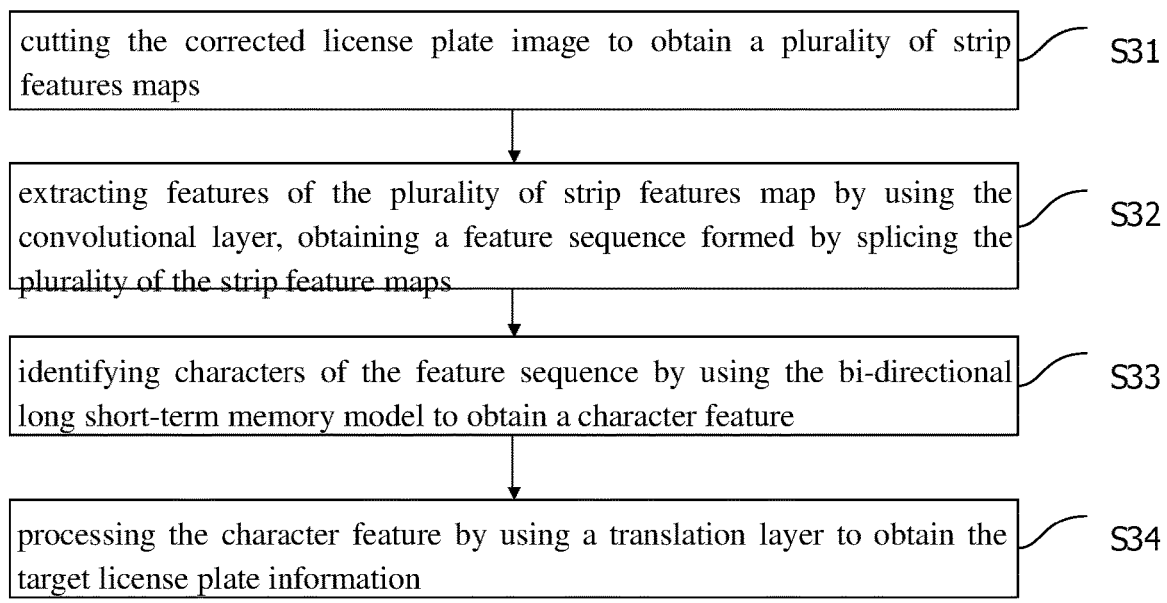
FIG. 4 is a specific flow chart of the step S30 in FIG. 1.

As shown in FIG. 4, in the step S30, the using the bi-directional long short-term memory model to identify the corrected license plate image to obtain the target license plate information comprises following steps:

S31: cutting the corrected license plate image to obtain a plurality of strip features maps.

Specifically, the corrected license plate image is input, and the corrected license plate image is switched in the longitudinal direction to form a plurality of strip feature maps. The number of strip feature maps depends on the length of the input corrected license plate image. In this embodiment, the corrected license plate image is cut according to the pixel width of 1 to obtain a plurality of strip feature maps.

S32: extracting features of the plurality of strip features map by using the convolutional layer, obtaining a feature sequence formed by splicing the plurality of the strip feature maps.

In this embodiment, the convolutional layers can be VGG-16 or other convolutional layers. The plurality of input strip feature maps is performed feature extraction by using the convolution layer. On all output channels of the last layer of the convolutional layers, a feature sequence is formed by splicing a plurality of the strip feature maps from left to right. In this embodiment, when the BLSTM model is used for identification, it is not necessary to separate each letter, number, or text of the corrected license plate image. The entire corrected license plate image is taken as an input directly, and all characters in the corrected license plate image can be identified. The principle is that the network structure of the BLSTM model can identify the timing information, so that when a plurality of feature maps with timing information are input, the characters can be directly identified. Therefore, the feature sequence formed by splicing a plurality of the strip feature maps from left to right depends on the requirements of identifying the characters by the BLSTM model.

S33: identifying characters of the feature sequence by using the bi-directional long short-term memory model to obtain a character feature.

In this embodiment, the bi-directional long short-term memory model is used as a loop network layer to characterize the feature sequence, multiple features in the feature sequence constitute characters. Compared with the loop network layer based on natural language to identify words (such as one-way LSTM or one-way RNN), it directly obtains character features, and can effectively improve the efficiency and accuracy of license plate identification.

S34: processing the character feature by using a translation layer to obtain the target license plate information.

In this embodiment, the translation layer can process the character features identified by the BLSTM to delete non-character features such as spaces; then final target license plate information is generated based on the license plate character dictionary. The license plate character dictionary refers to all characters that may appear on the license plate, including Chinese characters such as jing, xue, gang, yue, ling as well as characters such as capital letters and numbers.

Learning models such as the current one-way LSTM model or one-way RNN model are processed based on natural language and can only be used to identify words; the BLSTM model used in this embodiment can be used to identify characters in the corrected license plate image to improve the accuracy of license plate identification. In this embodiment, the corrected license plate image is switched into a plurality of strip feature maps, and then the plurality of the strip feature maps is performed feature extraction by using the convolution layer to obtain the feature sequence. Then, the BLSTM model is used to perform character identification on the feature sequence to obtain character features. Then, the character features are processed by using the translation layer to obtain the target license plate information. The efficiency and accuracy of the license plate identification can be effectively improved. When using the RNN model to identify, it needs to preprocess the image to obtain the feature sequence of the image in advance, which cannot achieve end-to-end processing; and when using the BLSTM model in this embodiment to identify, it only needs to enter the correct license plate image to output the target license plate information. The process does not need to be artificially processed, and can realize end-to-end processing, which improves the processing efficiency.

In the deep learning based license plate identification method provided by this embodiment, by extracting features of an original captured image by using a single shot multibox detector to obtain a target license plate image, it can detect the license plate for the original captured image obtained in any shooting scene; while the single shot multibox detector without the fully connected layer can effectively improve the detecting efficiency compared with other detection models with fully connected layers. Then, the target license plate image is corrected to obtain the corrected license plate image to avoid influencing the efficiency and accuracy of the subsequent license plate identification due to the license plate image tilting. Then using the bi-directional long short-term memory model to identify the corrected license plate image is beneficial to improve the efficiency and accuracy of the license plate identification, and can realize end-to-end identification without human intervention.

It should be understood that the size of the sequence of the steps in the above embodiments does not mean the execution order. The order of execution of each process should be determined by its function and internal logic, and should not be limited by the implementation process of the embodiments of the present invention.

The Second Embodiment

Figure 5:
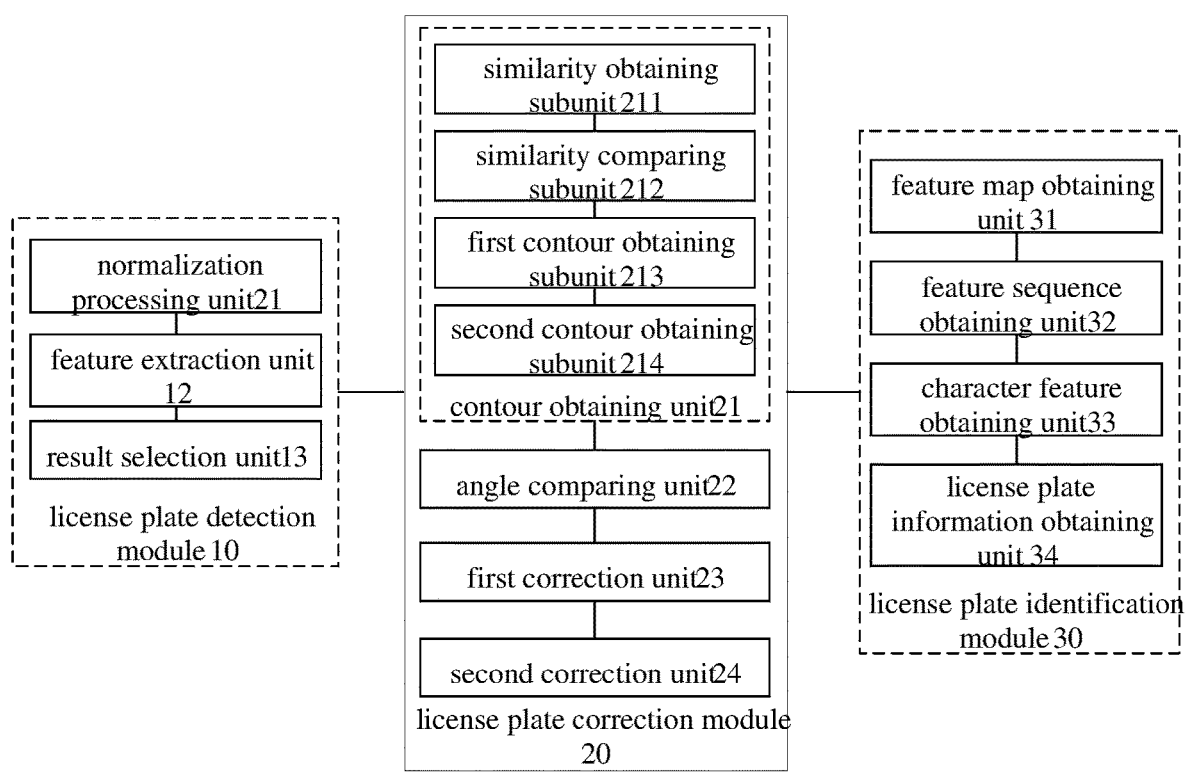
FIG. 5 is a principle diagram of the deep learning based license plate identification device in the second embodiment of the present invention.

Corresponding to the deep learning based license plate identification method in the first embodiment, FIG. 5 shows a deep learning based license plate identification device corresponded to the deep learning based license plate identification method in the first embodiment. As shown in FIG. 5, the deep learning based license plate identification device comprises a license plate detection module 10, a license plate correction module 20, and a license plate identification module 30. The implementation function of the license plate detection module 10, the license plate correction module 20, and the license plate identification module 30 corresponds to the corresponding step in the first embodiment, it will not be described in detail in this embodiment to avoid redundancy.

The license plate detection module 10 is used for extracting features of an original captured image by using a single shot multi-box detector to obtain a target license plate image.

The license plate correction module 20 is used for correcting the target license plate image to obtain a corrected license plate image.

The license plate identification module 30 is used for identifying the corrected license plate image by using a bi-directional long short-term memory model to obtain target license plate information.

The license plate detection module 10 comprises a normalization processing unit 21, a feature extraction unit 12, and a result selection unit 13.

The normalization processing unit 11 is used for performing normalization processing on the original captured image by using a trained single shot multi-box detector to obtain an original license plate image.

The feature extraction unit 12 is used for performing multi-scale feature extraction on the original license plate image by using a convolutional layer to obtain several layers of feature maps, extracting features of the several layers of feature maps by using several default boxes with different ratios to obtain classification results of each of the default boxes.

The result selection unit 13 is used for selecting classification result of the default box by using non-maximum suppression to obtain the target license plate image.

The license plate correction module 20 comprises: a contour obtaining unit 21, an angle comparing unit 22, a first correction unit 23, and a second correction unit 24.

The contour obtaining unit 21 is used for obtaining a license plate contour in the target license plate image.

The angle comparing unit 22 is used for obtaining an offset angle of the license plate contour, and determining whether the offset angle is larger than a preset offset value.

The first correction unit 23 is used for performing rotation, affine transformation, and uniform size processing on the license plate contour to obtain the corrected license plate image when the offset angle is larger than the preset offset value.

The second correction unit 24 is used for performing uniform size processing on the license plate contour to obtain the corrected license plate image when the offset angle is not larger than the preset offset value.

The contour obtaining unit 21 comprises a similarity obtaining subunit 211, a similarity comparing subunit 212, a first contour obtaining subunit 213, a second contour obtaining subunit 214.

The similarity obtaining subunit 211 is used for obtaining a color similarity between a license plate area and an edge area in the target license plate image.

The similarity comparing subunit 212 is used for determining whether the color similarity is greater than a preset similarity.

The first contour obtaining subunit 213 is used for taking the license plate area as the license plate contour when the color similarity is greater than the preset similarity.

The second contour obtaining subunit 214 used for performing gray-scale processing, Sobel operator, binarization, and closing operations on the target license plate image to obtain the license plate contour when the color similarity is not greater than the preset similarity.

The license plate identification module 30 comprises a feature map obtaining unit 31, a feature sequence obtaining unit 32, a character feature obtaining unit 33, and a license plate information obtaining unit 34.

The feature map obtaining unit 31 is used for cutting the corrected license plate image to obtain a plurality of strip features maps.

The feature sequence obtaining unit 32 is used for extracting features of the plurality of strip features map by using the convolutional layer, obtaining a feature sequence formed by splicing the plurality of the strip feature maps.

The character feature obtaining unit 33 is used for identifying characters of the feature sequence by using the bi-directional long short-term memory model to obtain a character feature.

The license plate information obtaining unit 34 is used for processing the character feature by using a translation layer to obtain the target license plate information.

In the deep learning based license plate identification device provided in this embodiment, the license plate detection module 10 uses a single shot multi-box detector to do feature extraction for an original captured image to obtain a target license plate image, it can detect the license plate for the original captured image obtained in any shooting scene; while the single shot multi-box detector without the fully connected layer can effectively improve the detecting efficiency compared with other detection models with fully connected layers. The license plate correction module 20 corrects the target license plate image to obtain the corrected license plate image to avoid influencing the efficiency and accuracy of the subsequent license plate identification due to the license plate image tilting. The license plate identification module 30 uses the bi-directional long short-term memory model to identify the corrected license plate image is beneficial to improve the efficiency and accuracy of the license plate identification, and can realize end-to-end identification without human intervention.

The Third Embodiment

This embodiment provides a computer readable storage medium, the computer readable storage medium stores a computer program. The computer program implements the deep learning based license plate identification method in the first embodiment when the computer program is executed by a processor. It will not be described in detail in this embodiment to avoid redundancy. Or, the computer program implements the functions of the modules or units in the deep learning based license plate identification device of the second embodiment. It will not be described in detail in this embodiment to avoid redundancy.

The Fourth Embodiment

Figure 6:
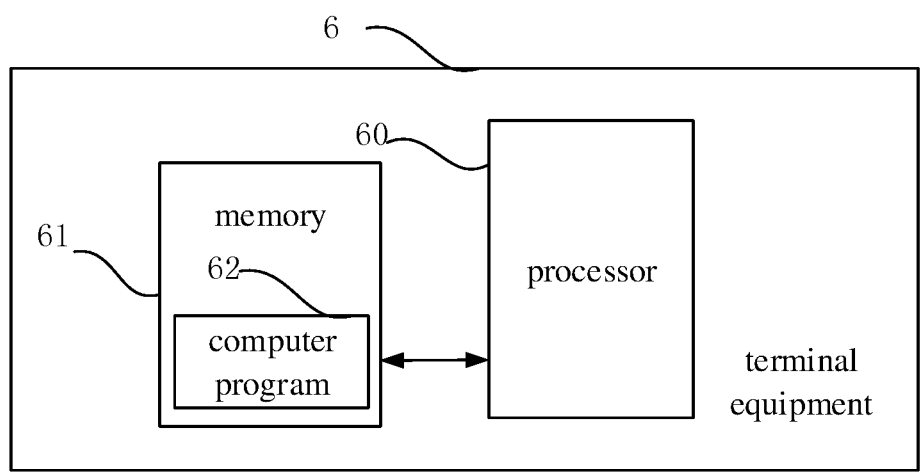
FIG. 6 is a schematic diagram of the terminal equipment in the third embodiment of the present invention.

FIG. 6 is a schematic diagram of the terminal equipment in this embodiment. As shown in FIG. 6, the terminal equipment 6 comprises a processor 60, a memory 61, and a computer program 62 which is stored in the memory 61 and can be operated on the processor 60. The processor 60 executes the computer program 62 to implement the steps of the deep learning based license plate identification method in the first embodiment, such as S10, S20, and S30 shown in FIG. 1. Or, the processor 60 executes the computer program 62 to implement the functions of the modules or units in the deep learning based license plate identification device of the second embodiment, such as the functions of the license plate detection module 10, the license plate correction module 20, and the license plate identification module 30 shown in FIG. 5.

For example, the computer program 62 can be divided into one or more modules/units, one or more modules/units are stored in the memory 61 and executed by the processor 60 to complete the invention. One or more modules/units can be a series of computer program instruction segments that are capable of performing a particular function. The instruction segments are used for describing the execution process of the computer program 62 in the terminal equipment 6. For example, the computer program 62 can be divided into the license plate detection module 10, the license plate correction module 20, and the license plate identification module 30.

The terminal equipment 6 can be a computing device such as a desktop computer, a notebook, a pocket computer, and a cloud server. The terminal device can include, but is not limited to, the processor 60, the memory 61. It will be understood by those skilled in the art that FIG. 6 is only an example of the terminal device 6, and does not constitute a limitation of the terminal device 6, and may include more or fewer components than those illustrated, or combine some components or different components. For example, the terminal equipment can further include an input/output device, a network access device, and a bus.

The processor 60 can be a central processing unit (CPU), other general processers, a digital signal processor (DSP), an application specific integrated circuit (ASIC), a field-programmable gate array (FPGA), other programmable logic devices, a discrete gate, a transistor logic device, or a discrete hardware component. The general processer can be a microprocessor or any conventional processor.

The memory 61 can be an internal storage unit of the terminal equipment 6, such as a hard disk or a memory of the terminal equipment 6. The memory 61 can also be an external storage device of the terminal equipment 6, such as a plug-in hard disk, a smart media card (SMC), a secure digital (SD) card, a flash card provided on the terminal equipment 6. Further, the memory 61 can also include both an internal storage unit and an external storage device of the terminal equipment 6. The memory 61 is used to store computer programs, and other programs and data required by the terminal devices. The memory 61 can also be used to temporarily store data that has been output or is about to be output.

It can be understood by those skilled in the art that, for convenience and brevity of description, only the division of each functional unit and module described above is illustrated. In practical applications, the above functions can be assigned to different functional units and modules based on needs. That is, the internal structure of the device is divided into different functional units or modules to perform all or part of the functions described above. Each functional unit and module in the embodiment can be integrated into one processing unit, or each unit may exist physically separately, or two or more units can be integrated into one unit. The above integrated unit can be implemented in the form of hardware or in the form of a software functional unit. In addition, the specific names of the functional units and modules are only for the purpose of mutual differentiation, and are limited in the scope of protection of the present application. The specific working process of the unit and the module in the above system can refer to the corresponding process in the above method embodiment, and details are not described herein again.

In the above embodiments, the descriptions of the various embodiments are different, and the parts that are not detailed or described in a certain embodiment can be referred to the related descriptions of other embodiments.

Those skilled in the art can realize that the combination of the units and algorithm steps of the examples described in the disclosed embodiments of the present invention can be implemented by an electronic hardware or a combination of computer software and electronic hardware. Whether these functions are performed in hardware or software depends on the specific application and design constraints of the solution. Those skilled in the art can use different methods to implement the described functions for each particular application, but such implementation should not be considered to be beyond the scope of the present invention.

In the embodiments provided by the present invention, it should be understood that the disclosed device/terminal equipment and method can be implemented in other manners. For example, the equipment/terminal device embodiments described above are merely illustrative. For example, the division of the module or unit is only a logical function division, and the actual implementation can have another division manner. For example, multiple units or components can be combined or integrated into another system, or some features may be omitted or not implemented. In addition, the mutual coupling or direct coupling or communication connection shown or discussed can be an indirect coupling through some interface, device, or unit or communication connection, which is electrical, mechanical, or in other forms.

The units described as separate components may or may not be physically separated. The component displayed as a unit may or may not be a physical unit, it can be located in one place, or can be distributed to multiple network units. Some or all of the units can be selected according to actual needs to achieve the purpose of the solution of the embodiment.

In addition, each functional unit in each embodiment of the present invention can be integrated into one processing unit, or each unit exist physically separately, or two or more units are integrated into one unit. The above integrated unit can be implemented in the form of hardware or in the form of a software functional unit.

The integrated modules/units, if implemented in the form of software functional units and sold or used as separate products, can be stored in a computer readable storage medium. Based on such understanding, all or part of the processes implemented in the above embodiments of the present invention can also be implemented by a computer program to instruct related hardware. The computer program can be stored in a computer readable storage medium. When the computer program is executed by a processor, it can implement the steps of the various method embodiments described above. The computer program includes computer program code, which may be in the form of source code, object code, executable file, or some intermediate form. The computer readable medium can include: any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media. It should be noted that the content contained in the computer readable medium can be appropriately increased or decreased according to the requirements of legislation and patent practice in the jurisdiction. For example, in some jurisdictions, the computer readable media does not include electrical carrier signals and telecommunications signals in accordance with legislation and patent practice.

The embodiments described above are only for explaining the technical solutions of the present invention, and are not limited thereto; although the present invention has been described in detail with reference to the above embodiments, those skilled in the art should understand: they can still modify the technical solutions described in the above embodiments, or replace some of the technical features; the modifications and replacements of the present invention do not make corresponding technical solutions separate from the spirit and scope of the technical solutions of the embodiments of the present invention, and should be included in the scope of the present invention.

What is claimed is:

1. A deep learning based license plate identification method, comprising:
    extracting features of an original captured image by using a single shot multi-box detector to obtain a target license plate image;
    correcting the target license plate image to obtain a corrected license plate image;
    identifying the corrected license plate image by using a bi-directional long short-term memory model to obtain target license plate information;
    wherein the extracting features of the original captured image by using the single shot multi-box detector to obtain the target license plate image comprises:
    performing normalization processing on the original captured image by using a trained single shot multi-box detector to obtain an original license plate image;
    performing multi-scale feature extraction on the original license plate image by using a convolutional layer to obtain several layers of feature maps, extracting features of the several layers of feature maps by using several default boxes with different ratios to obtain classification results of each of the default boxes;
    selecting classification result of the default box by using non-maximum suppression to obtain the target license plate image.

2. The deep learning based license plate identification method according to claim 1, wherein the deep learning based license plate identification method further comprises: pre-training the single shot multi-box detector, and storing the trained single shot multi-box detector;
    the pre-training the single shot multi-box detector comprises:
    obtaining the original captured image for training the single shot multi-box detector;
    recognizing a license plate position by using a rectangular box to obtain a ground truth box;
    determining a positive sample and a negative sample based on the intersection-over-union between the default box and the ground truth box;
    training the single shot multi-box detector by using the positive sample and the negative sample to obtain the trained single shot multi-box detector.

3. The deep learning based license plate identification method according to claim 1, wherein the step of selecting classification result of the default box by using non-maximum suppression to obtain the target license plate image comprises:
    selecting a default box with the largest classification result as the target box from the classification results of the default box;
    deleting the default box whose intersection-over-union with the target box is greater than a certain threshold, updating the default box with the largest classification result from the default box whose intersection-over-union with the target box is not greater than the certain threshold to a new target box;
    obtaining the target license plate image based on the target box.

4. The deep learning based license plate identification method according to claim 1, wherein the step of correcting the target license plate image to obtain the corrected license plate image comprises:
    obtaining a license plate contour in the target license plate image;
    obtaining an offset angle of the license plate contour, and determining whether the offset angle is larger than a predetermined offset value;
    performing rotation, affine transformation, and uniform size processing on the license plate contour to obtain a corrected license plate image if the offset angle is larger than the predetermined offset value;
    performing uniform size processing on the license plate contour to obtain the corrected license plate image if the offset angle is not larger than the predetermined offset value.

5. The deep learning based license plate identification method according to claim 4, wherein the step of obtaining the license plate contour in the target license plate image comprises:
    obtaining a color similarity between a license plate area and an edge area in the target license plate image;
    determining whether the color similarity is greater than a predetermined similarity or not;
    taking the license plate area as the license plate contour if the color similarity is greater than the predetermined similarity;
    performing gray-scale processing, Sobel operator, binarization, and closing operations on the target license plate image to obtain the license plate contour if the color similarity is not greater than the predetermined similarity.

6. The deep learning based license plate identification method according to claim 1, wherein the step of identifying the corrected license plate image by using the bi-directional long short-term memory model to obtain target license plate information comprises:
    cutting the corrected license plate image to obtain a plurality of strip features map;
    extracting features of the plurality of strip features map by using the convolutional layer, obtaining a feature sequence formed by splicing the plurality of the strip feature maps;
    identifying characters of the feature sequence by using the bi-directional long short-term memory model to obtain a character feature;
    processing the character feature by using a translation layer to obtain the target license plate information.

7. A terminal equipment, the equipment comprises a memory, a processor, and a computer program which is stored in the memory and can be operated on the processor, wherein the processor implements following steps when executing the computer program:
    extracting features of an original captured image by using a single shot multi-box detector to obtain a target license plate image;
    correcting the target license plate image to obtain a corrected license plate image;

identifying the corrected license plate image by using a bi-directional long short-term memory model to obtain target license plate information;

wherein the step of extracting features of an original captured image by using a single shot multi-box detector to obtain a target license plate image comprises:

performing normalization processing on the original captured image by using a trained single shot multi-box detector to obtain an original license plate image;

performing multi-scale feature extraction on the original license plate image by using a convolutional layer to obtain several layers of feature maps, extracting features of the several layers of feature maps by using several default boxes with different ratios to obtain classification results of each of the default boxes;

selecting classification result of the default box by using non-maximum suppression to obtain the target license plate image.

8. The terminal equipment according claim 7, wherein the step of correcting the target license plate image to obtain the corrected license plate image comprises:

obtaining a license plate contour in the target license plate image;

obtaining an offset angle of the license plate contour, and determining whether the offset angle is larger than a predetermined offset value;

performing rotation, affine transformation, and uniform size processing on the license plate contour to obtain a corrected license plate image if the offset angle is larger than the predetermined offset value;

performing uniform size processing on the license plate contour to obtain the corrected license plate image if the offset angle is not larger than the predetermined offset value.

9. The terminal equipment according claim 8, wherein the step of obtaining the license plate contour in the target license plate image comprises:

obtaining a color similarity between a license plate area and an edge area in the target license plate image;

determining whether the color similarity is greater than a predetermined similarity;

taking the license plate area as the license plate contour if the color similarity is greater than the predetermined similarity;

performing gray-scale processing, Sobel operator, binarization, and closing operations on the target license plate image to obtain the license plate contour if the color similarity is not greater than the predetermined similarity.

10. The terminal equipment according claim 7, wherein the step of using the bi-directional long short-term memory model to identify the corrected license plate image to obtain the target license plate information comprises:

cutting the corrected license plate image to obtain a plurality of strip features map;

extracting features of the plurality of strip features map by using the convolutional layer, obtaining a feature sequence formed by splicing the plurality of the strip feature maps;

identifying characters of the feature sequence by using the bi-directional long short-term memory model to obtain a character feature;

processing the character feature by using a translation layer to obtain the target license plate information.

11. A non-transitory computer readable storage medium, the computer readable storage medium stores a computer program, wherein the computer program implements following steps when the computer program is executed by a processor:

extracting features of an original captured image by using a single shot multi-box detector to obtain a target license plate image;

correcting the target license plate image to obtain a corrected license plate image;

identifying the corrected license plate image by using a bi-directional long short-term memory model to obtain target license plate information;

wherein the step of extracting features of the original captured image by using the single shot multi-box detector to obtain the target license plate image comprises:

performing normalization processing on the original captured image by using a trained single shot multi-box detector to obtain an original license plate image;

performing multi-scale feature extraction on the original license plate image by using a convolutional layer to obtain several layers of feature maps, extracting features of the several layers of feature maps by using several default boxes with different ratios to obtain classification results of each of the default boxes;

selecting classification result of the default box by using non-maximum suppression to obtain the target license plate image.

12. The non-transitory computer readable storage medium according to claim 11, wherein the step of correcting the target license plate image to obtain the corrected license plate image comprises:

obtaining a license plate contour in the target license plate image;

obtaining an offset angle of the license plate contour, and determining whether the offset angle is larger than a predetermined offset value;

performing rotation, affine transformation, and uniform size processing on the license plate contour to obtain a corrected license plate image if the offset angle is larger than the predetermined offset value;

performing uniform size processing on the license plate contour to obtain the corrected license plate image if the offset angle is not larger than the predetermined offset value.

13. The non-transitory computer readable storage medium according to claim 12, wherein the step of obtaining the license plate contour in the target license plate image comprises:

obtaining a color similarity between a license plate area and an edge area in the target license plate image;

determining whether the color similarity is greater than a predetermined similarity;

taking the license plate area as the license plate contour if the color similarity is greater than the predetermined similarity;

performing gray-scale processing, Sobel operator, binarization, and closing operations on the target license plate image to obtain the license plate contour if the color similarity is not greater than the predetermined similarity.

14. The non-transitory computer readable storage medium according to claim 11, wherein the step of identifying the corrected license plate image by using the bi-directional long short-term memory model to obtain the target license plate information comprises:

cutting the corrected license plate image to obtain a plurality of strip features map;

extracting features of the plurality of strip features map by using the convolutional layer, obtaining a feature sequence formed by splicing the plurality of the strip feature maps;

identifying characters of the feature sequence by using the bi-directional long short-term memory model to obtain a character feature;

processing the character feature by using a translation layer to obtain the target license plate information.

\* \* \* \* \*